United States Patent [19]
Dorris et al.

[11] Patent Number: 5,867,710
[45] Date of Patent: Feb. 2, 1999

[54] PORTABLE MICROKERNEL OPERATING SYSTEM VERIFICATION AND TESTING

[75] Inventors: Roderick Lee Dorris; Eric Nassar Robertson, both of Austin, Tex.

[73] Assignee: Motorola, Inc., Austin, Tex.

[21] Appl. No.: 523,178

[22] Filed: Sep. 5, 1995

[51] Int. Cl.[6] .................................................. G06F 11/34
[52] U.S. Cl. .......................................... 395/704; 395/681
[58] Field of Search .................................... 395/704, 670, 395/681, 682, 183.14; 364/280.9, 275.5

[56] References Cited

U.S. PATENT DOCUMENTS 5,339,261  8/1994  Aldeson et al. ......................... 364/570
5,371,883  12/1994  Gross et al. ............................ 395/575

OTHER PUBLICATIONS

Thomas, Benjamin J., III, Open VMS I/O: kernel processes. (The use and internals of the Kernel Process support code in the Open VMS AXP I/O subsystem), Digital Systems Journal, Sep.–Oct. 1994 v16 n5 p5(8).

Saxena et al., "Fault–Tolerant Features in the HAL Memory Management unit", IEEE Transactions on Computers, vol. 44, No. 2, Feb. 1995.

Caerts et al., "PDG: a Portable Process–level Debugger for CSP–style Parallel Programs", IEEE, 1994.

Rim et al., "Message–based Microkernel for real–time System", Department of computer Engineering, Seoul National University, Seoul, 151–742 Korea, 0–8186–2755–Jul. 1992, 1992 IEEE.

*Primary Examiner*—Frantzy Poinvil
*Attorney, Agent, or Firm*—Jeffrey G. Toler

[57] ABSTRACT

A Hardware Abstraction Layer (HAL) (66) of a Portable Microkernel Operating System (OS) is tested and verified by loading a HAL test program (96) into Kernel Space (60) as a device driver. This allows direct access to the HAL layer (66) and to the computer hardware accessed by the HAL layer (66). The HAL test program (96) makes HAL layer requests, then verifies HAL (66) operation by directly examining the hardware affected by the HAL request. The HAL test program (96) is controlled by either an external HAL test system (98), or by a HAL control program (99) executing in User space (62).

13 Claims, 5 Drawing Sheets

PORTABLE MICROKERNEL OPERATING SYSTEM VERIFICATION AND TESTING

FIELD OF THE INVENTION

The present invention generally relates to computer operating systems, and more specifically to verifying and testing the Hardware Abstraction Layer of a Portable Microkernel Operating System.

BACKGROUND OF THE INVENTION

The preferred Operating System (OS) design for ease of porting across computer architectures is a Microkernel Operating System with its hardware specific portions isolated in a Hardware Abstraction Layer (HAL) set of modules. Porting to a new architecture then only requires replacing or modifying the HAL, and recompiling the remainder of the Operating System with a compiler targeted to the new architecture.

One problem that has slowed successful Microkernel Operating System porting is the testing of a new HAL. Testing is difficult for a number of reasons. First, there is an abstraction mismatch between User/Kernel interface requests and the corresponding Kernel/HAL interface requests. Often a single Kernel request will translate into an undeterministicly larger number of HAL interface commands. Secondly, some HAL requests have no direct Kernel request counterparts. The result has been slipshod and difficult HAL testing.

SUMMARY OF THE INVENTION

In accordance with the invention, a Hardware Abstraction Layer (HAL) of a Portable Microkernel Operating System (OS) is tested and verified by loading a HAL test program into Kernel Space as a device driver. This allows direct access to the HAL layer and to the computer hardware accessed by the HAL layer. The HAL test program makes HAL layer requests, then verifies HAL operation by directly examining the hardware affected by the HAL request. The HAL test program is controlled by either an external HAL test system, or by a HAL control program executing in User space.

These and other features, and advantages, will be more clearly understood from the following detailed description taken in conjunction with the accompanying drawings. It is important to point out that there may be other embodiments of the present invention which are not specifically illustrated.

DETAILED DESCRIPTION OF A PREFERRED EMBODIMENT

State-of-the-art Microkernel Operating Systems such as Windows NT™ and OS/2™ are designed to be portable across hardware platforms and processor architectures. Much of this portability is currently achieved by abstracting out of the Operating System ("OS") the portions which are hardware specific and dependent, and porting these hardware specific portions for each platform on which the Operating System is to be run. This greatly enhances portability by isolating the hardware dependencies.

One can contrast this approach with that found with MS-DOS™, which has never been successfully ported to a non-x86 (Intel) architecture. Another example is the UNIX™ Operating System, in which the entire OS must be laboriously ported, resulting in a relatively proprietary OS in the process.

One major problem encountered in implementing these new Portable Operating Systems ("OS") is that their hardware dependent portions are at the lowest levels because they must be in contact with the hardware. The result is that this layer is not directly accessible for verification of proper operation under a controlled set of inputs. All device drivers which control peripheral devices, the Operating System (OS), and all applications which are dependent upon the OS, are dependent upon the proper construction and operation of these hardware portions of each portable OS.

This invention allows direct access to and controlled manipulation of these low-level hardware dependent portions of the Portable OS, thus enabling their verification on specific platforms such that a Portable Microkernel Operating System (PMOS) its associated device drivers, and all the application software dependent upon it may be run on the specific hardware platforms.

A low-level Kernel device driver is used to probe, exercise, and verify the Hardware Abstraction Layer (HAL) of a Microkernel Operating System such as WindowsNT™. This driver is loaded into Kernel space very early in the system boot process and has access to the hardware, hardware specific portions of the OS, the OS memory space and data structures, and the Hardware Abstraction Layer (HAL).

The low level device driver takes control of the system during normal boot procedures which activates the device driver's initialization routines. Once in control, the device driver probes the hardware specific portions of the Operating System (OS) and verifies its proper operation. It is highly configurable by means of configuration information stored in Non-Volatile RAM (NVRAM). It verifies proper interfacing with processor specific devices such as supervisor-level registers, dual level cache, as well as platform specific devices such as a PCI bus.

Figure 1:
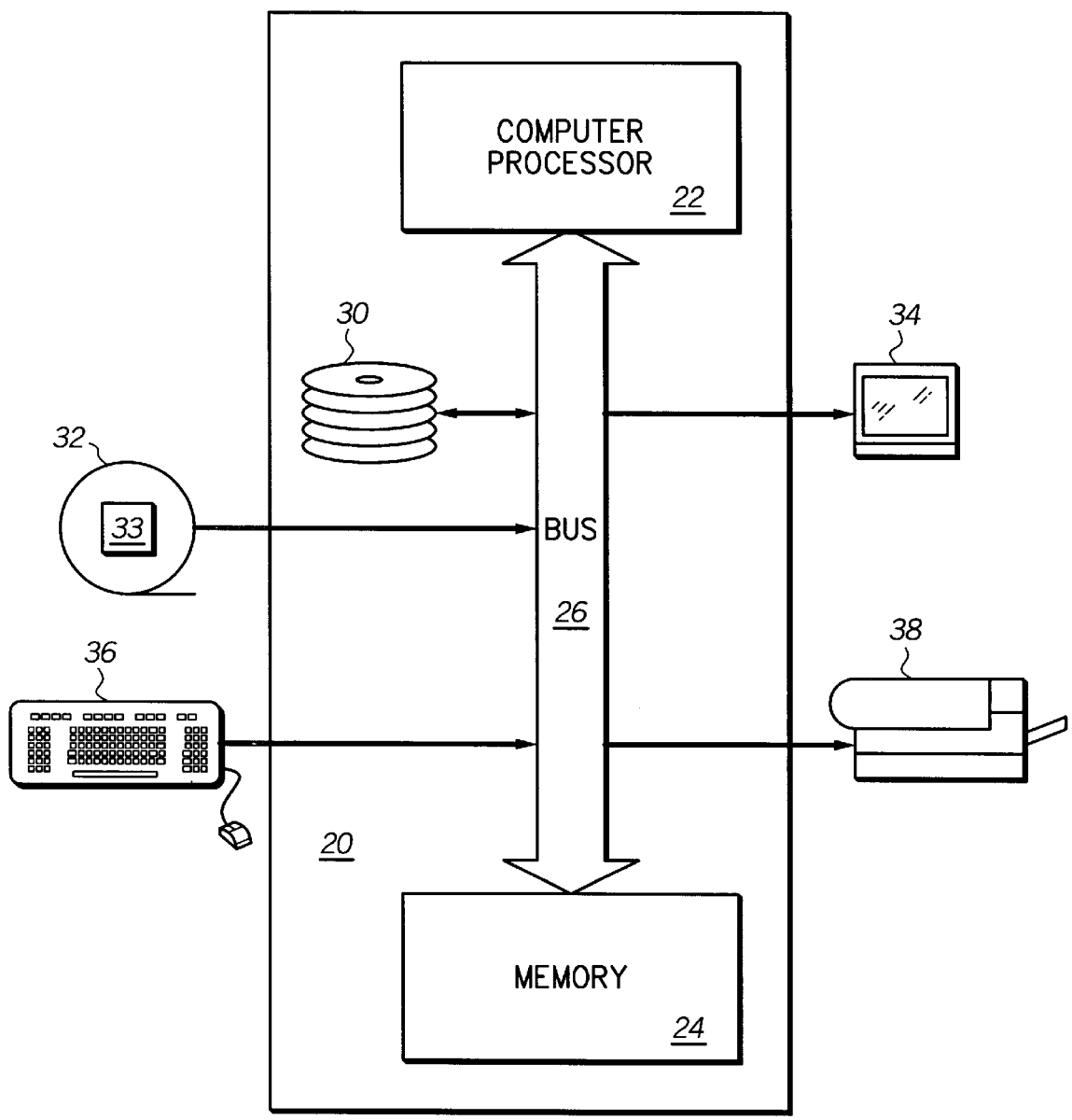
FIG. 1 is a block diagram showing a General Purpose Computer executing a Microkernel Operating System, in accordance with the present invention.

FIG. 1 is a block diagram showing a General Purpose Computer 20. The General Purpose Computer 20 has a Computer Processor 22, and Memory 24, connected by a Bus 26. Also connected to the Bus are Secondary Storage, such as hard disk drives 30, External Storage 32, a monitor 34, a keyboard (with mouse) 36, and a printer 38. The External Storage 32 may be floppy disks, magnetic tape, CD-ROM, or even another computer. Note that executable versions of computer software 33, such as an OS, HAL test code, and user programs can be read from the External Storage 32 and loaded for execution directly into the Memory 34, or stored on the Secondary Storage 30 prior to loading into Memory 34 and execution.

Figure 2:
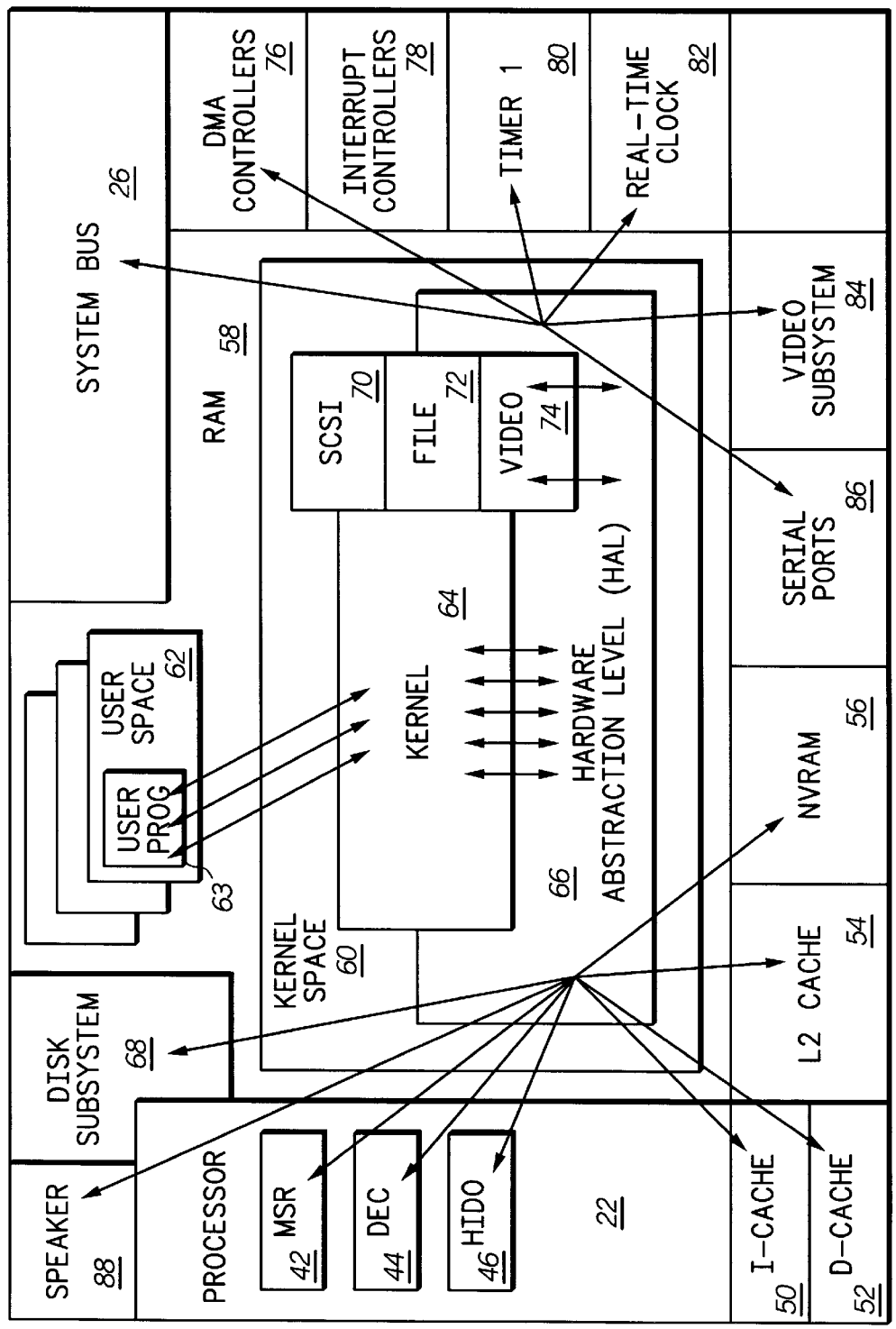
FIG. 2 is a block diagram showing a more detailed view of a General Purpose Computer executing a Microkernel Operating System.

FIG. 2 is a block diagram showing normal operation of a General Purpose Computer 20 Operating System (OS). The Computer Processor 22 has a number of supervisory accessible elements, including a Machine State Register (MSR) 42, a Decrementer 44, and a Hardware Implementation Designator (HID0) 46. The MSR 42 contains a number of bits that control execution of the processor 22. For example, one or more bits in the MSR 42 can be used to distinguish between Supervisor/Kernel mode and User/Problem mode. The HID0 46 is similar, but contains hardware implementation dependent control flags or bits. For example, the MSRs 42 for PowerPC™ models 603 and 604 will be similar, whereas model differences are isolated in the HID0 46. The Decrementer 44 is used by an Operating System (OS) for reasonably precise clocking. It is loaded with a value, then decrements once per clock cycle, finally interrupting the processor for interrupt processing when it decrements to zero.

Also included in the system are different types or speeds of Memory 24. Faster microcomputers today will often have separate Instruction Caches (I-Cache) 50 and Data Caches (D-Cache) 52. These can be either onboard the primary Processor chip, or at least packaged with the Processor 22. Next in speed are Level 2 Caches (L2 Cache) 54. Today L2 Caches 54 are predominantly composed of Static RAM (SRAM). The lowest level or slowest internal Volatile Memory is Dynamic RAM (DRAM) 58. Finally, most systems also include a quantity of Non-Volatile RAM (NVRAM) 56. This NVRAM 56 can be separated into true Read-Only-Memory (ROM) used for such things as bootstrap code, and modifiable memory, such as EPROM and EEPROM, often used to contain configuration across boots and shutdowns.

The memory address space is divided into two levels or layers of memory: "Kernel" Space 60, and "User" Space 62. This separation can be done by use of a mode bit, or a key, usually located in the MSR 42. As a note, some computer architectures support more than two address levels or rings. However, the discussion herein is limited to two levels of memory for illustrative purposes. The invention will operate as well with more.

There are actually two different, interrelated concepts applicable here: separating Memory Space into two or more different "Memory" modes, and separating execution into two or more different "Execution" modes. Each "Memory" mode corresponds to a different "Memory" address space. A User Program 63 usually operates in "User" or "Problem" state, only able to access a "User" address Space 62. However, the User Program 63 can make Kernel or supervisory requests, which are ultimately answered by routines operating in Kernel Execution Mode. In Kernel Execution Mode, Kernel routines 64 access both Kernel Space 60 and User Space 62. Note that multiple User Spaces 62 are illustrated, each such User Memory Space 62 containing one or more User Programs 63.

Stored in the Kernel address Space 60 with the Kernel 64 are the data structures used by the Kernel 64 to control the operation of the Computer 20. Also located in Kernel Space 60 are the Hardware Abstraction Layer 66, SCSI drivers 70, File System drivers 72, and Video drivers 74.

User Programs 63 are strictly limited to the extent that they can directly access much of the hardware and software on modern computers running modern Operating Systems (OS). Much of this limitation is enforced through hardware means by restricting which instructions can be executed in User or program Execution Mode, and which hardware (including which Memory 24) can be accessed in that mode.

In order for User Programs 63 to accomplish tasks that require access to the restricted hardware and software, User Programs 63 operating in User Space 62 make Kernel Requests to the Kernel 64 operating in Kernel Space 60. All Kernel Operating Systems have available functions for passing Kernel Requests and results back and forth between User Programs 63 and the Kernel 64. This function or mechanism will invariably cause a change of state back and forth between User and Kernel Execution State and User and Kernel Address Space. This mechanism is an interrupt mechanism in many architectures, but may utilize queues or gated subroutine calls in other architectures.

One of the hallmarks of a Portable Operating System (OS) is that the hardware dependencies are isolated into a certain layer or set of modules. In the example shown, this hardware dependent layer or set of modules is the Hardware Abstraction Layer (HAL) 66. The portable Kernel then operates by accepting User Execution Mode Kernel Requests and translating these Kernel Requests into the appropriate HAL 66 requests in order to perform the Kernel Requests.

The Hardware Abstraction Layer (HAL) 66 then communicates directly with the hardware and Operating System (OS) specific functions. In FIG. 2, the HAL 66 is shown directly addressing the MSR 42, Decrementer 44, HID0 46, I-Cache 50, D-Cache 52, L2 Cache 54, and NVRAM 56. It is used to control dynamic memory allocation, including separating User Space 62 from Kernel Space 60 and from other User Spaces 62. The HAL 66 is also used to directly access the System Bus 26, Disk Subsystem 68, Direct Memory Access (DMA) Controllers 76, Interrupt Controllers 78, Timers 80, the Real-Time Clock 82, the Video Subsystem 84, the Serial Ports 86, and the Speaker 88. Finally, the HAL 66 can invoke the hardware specific portions of the Video Driver 74, File System Driver 72, and SCSI Driver 70.

Note that a SCSI Driver 70 is shown. This is for illustrative purposes only. The invention is not limited to this peripheral bus interface, but rather is applicable to other such architectures such as ISA, VESA, and PCI. Likewise the Disk Subsystem 68 is representative of storage media interfaces for Secondary Storage, such as hard disk drives 30, and External Storage media 32.

Theoretically then, the way to port a Portable Operating System like the one shown in FIG. 2 to a new hardware architecture platform is to write a new HAL 66, and recompile the Kernel 64. This has been done for a number of architectures for the Microsoft WindowsNT™ Operating System. Unfortunately, it has proven difficult to test and validate the operation of a HAL 64 for new architectures.

Figure 3:
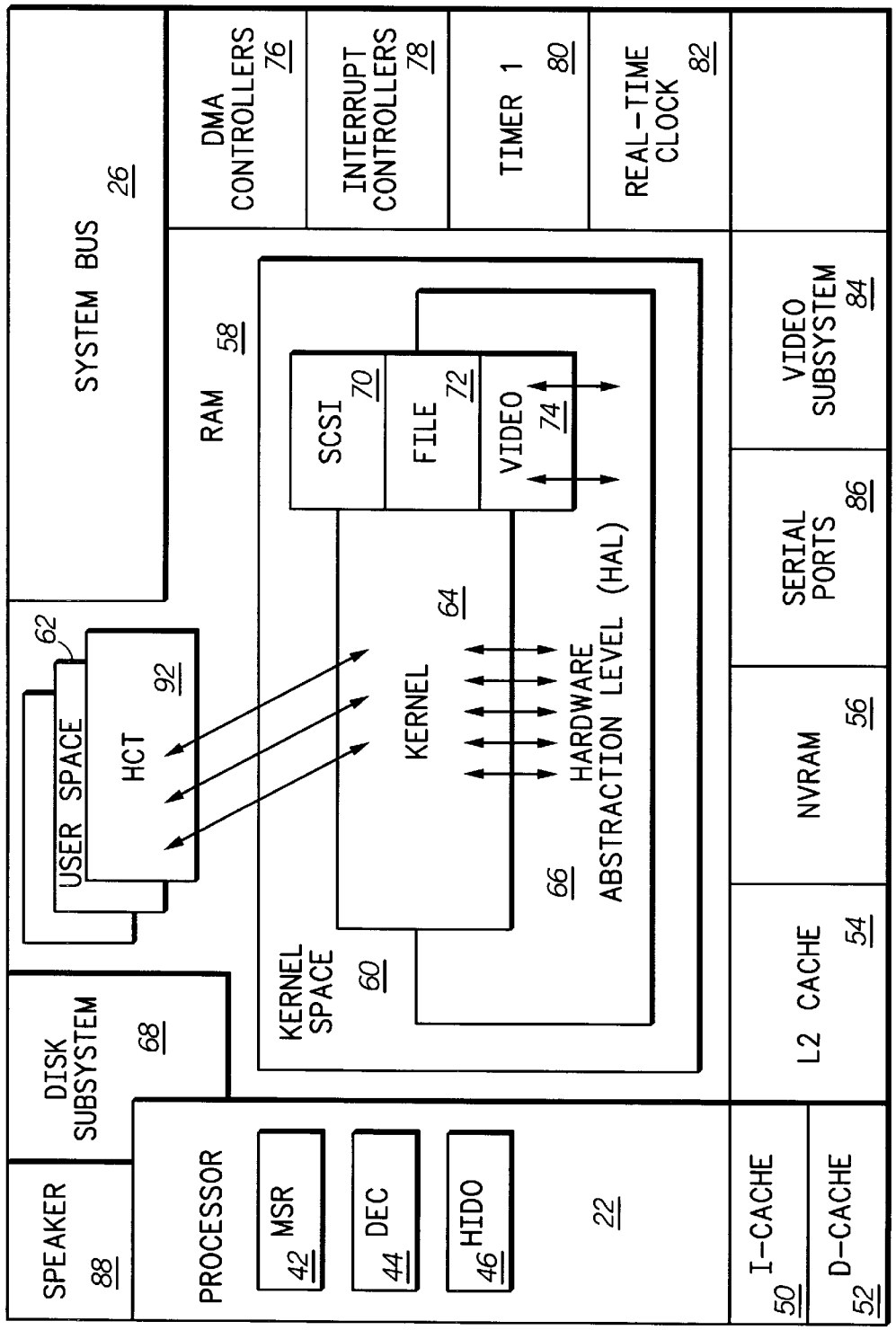
FIG. 3 is a block diagram with the same blocks as FIG. 2, additionally showing a Prior Art method of HAL layer testing and verification.

FIG. 3 (Prior Art) is a block diagram showing the traditional method of testing and validating a new Hardware Abstraction Layer (HAL) 66. Most of the features in FIG. 2 are present in FIG. 3 A Hardware Compatibility Test (HCT) program 92 operating as a User Program 63 in User Space 62 makes Kernel Requests to the Kernel 64 in Kernel Space 60. The Kernel 64 then makes HAL requests to the HAL 66. The HAL 66 performs the requested function and returns status information back to the Kernel 64, which ultimately reports back to the HCT 92.

One major problem with this type of verification and testing is that the level of abstraction varies significantly between the HCT 92/Kernel 64 interface, the Kernel 64/HAL 66 interface, and the HAL 66/hardware interfaces. The result is that there is not a neat one-to-one mapping between Kernel functions and hardware actions.

For example, an I/O request may start as a file I/O request in the HCT 92. It may be turned into a number of DMA requests by the HAL 66. One analogy for the difficulty faced here is to visualize dialing a phone or turning on a light from the other end of a long pole. The result of using this traditional method of testing and validating HALs 66 is error prone, time consuming, and not very thorough.

Figure 4:
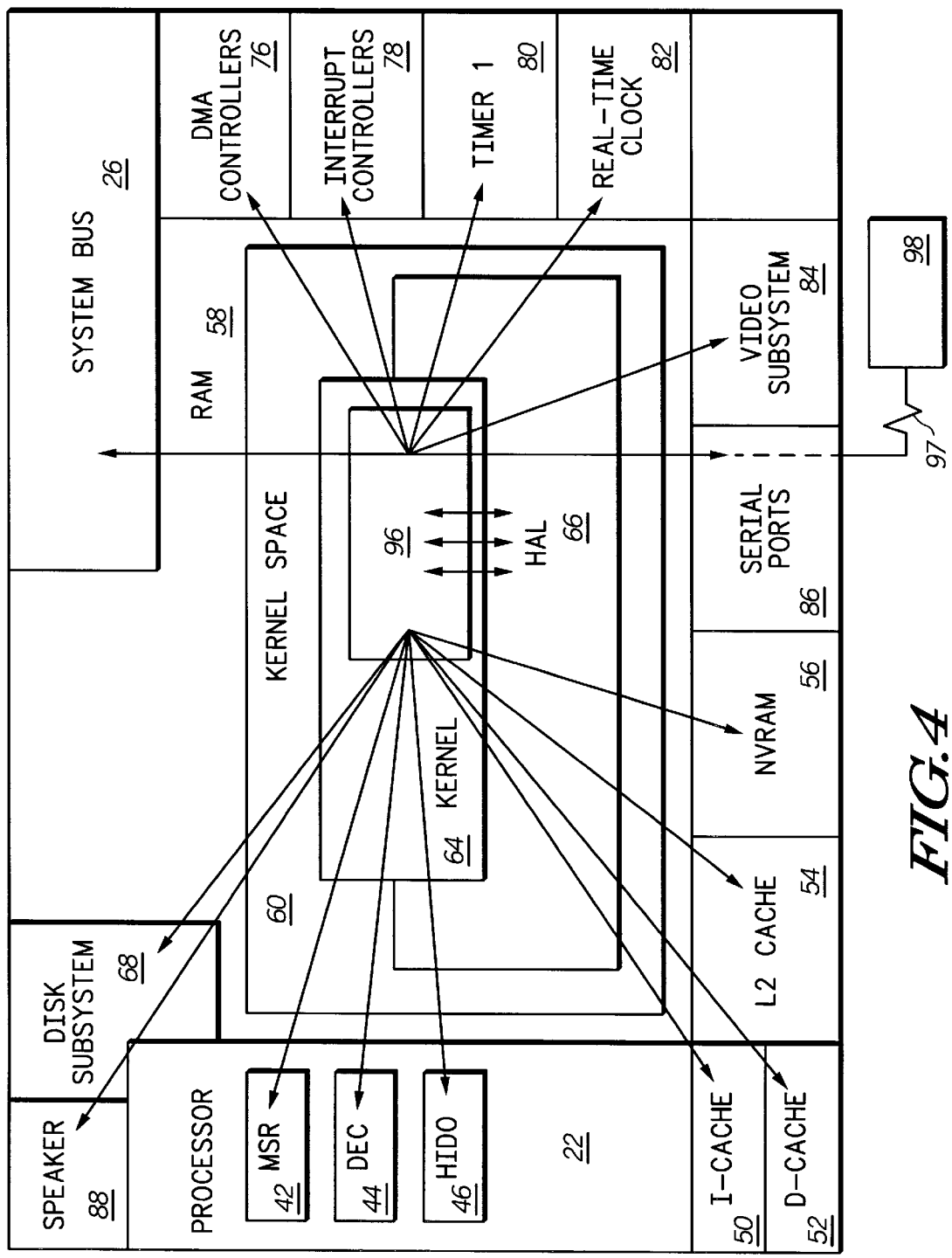
FIG. 4 is a block diagram with the same blocks as FIG. 2, additionally showing a Kernel space HAL test routine communicating with an external HAL test system, in accordance with one embodiment of the present invention.
Figure 5:
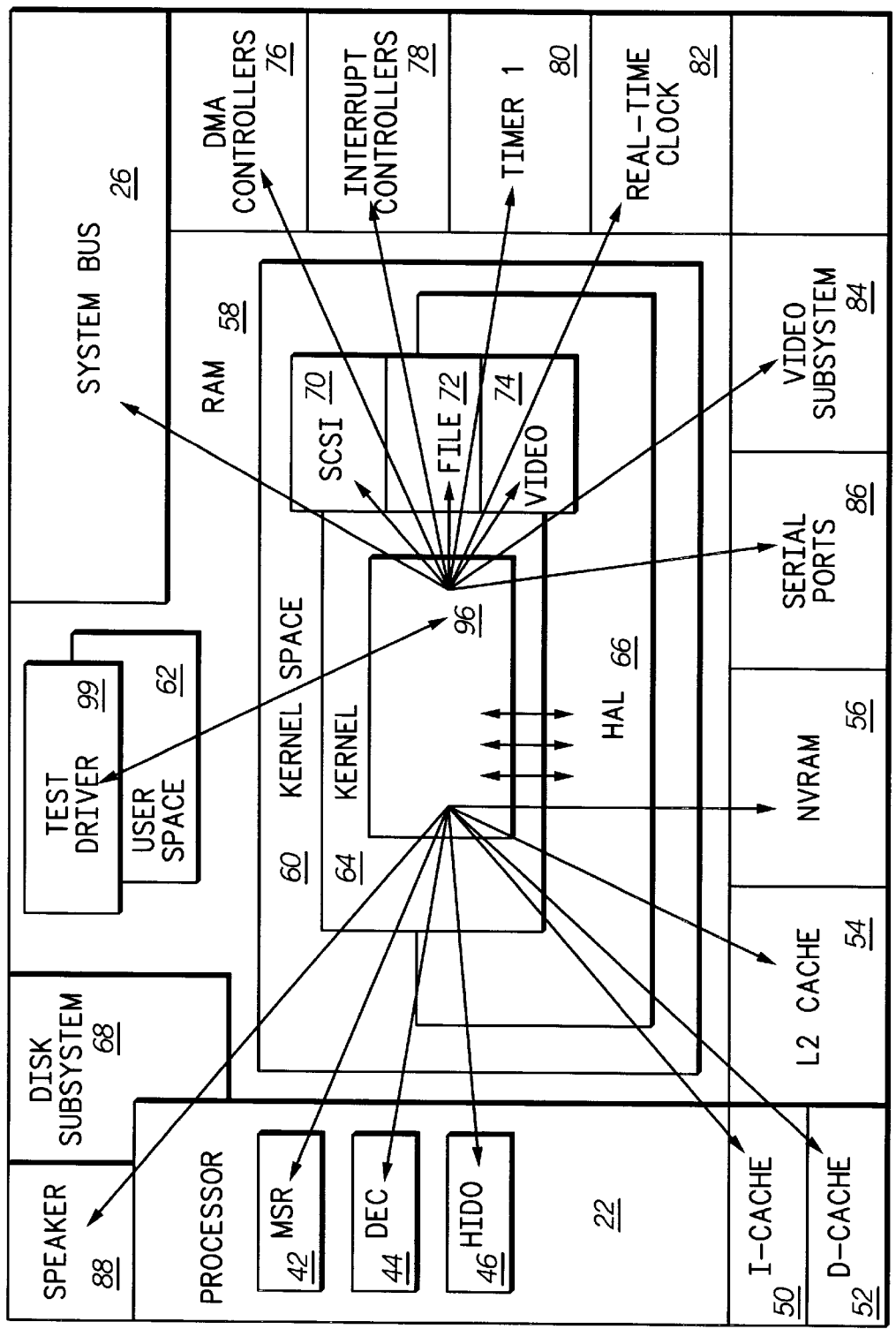
FIG. 5 is a block diagram with the same blocks as FIG. 2, additionally showing a Kernel space HAL test routine communicating with a User space HAL test control program, in accordance with one embodiment of the present invention.

FIG. 4 and FIG. 5 show two closely related solutions to the problems discussed above for the Prior Art solution shown in FIG. 3. Both FIG. 4 and FIG. 5 have most of the same components as FIG. 2 and FIG. 3. Added to both FIG. 4 and FIG. 5 is a Kernel Space 60 based HAL Test Subsystem 96. This HAL Test Subsystem 96 can be loaded at initialization time as a Kernel Space 60 device driver. For example, it may replace the SCSI driver 70 shown in FIG. 2 and FIG. 3. The HAL Test Subsystem 96 then can issue HAL requests directly to the HAL 66. It can then interrogate the hardware presumably affected by the HAL request to determine whether the HAL request was correctly executed. For example, the HAL Test Subsystem 96 may make a request to the HAL 66 that should modify the MSR 42. After the HAL 66 returns a successful status, the MSR 42 can then be directly interrogated to determine whether the action taken by the HAL 66 was indeed correct. Note that the process can also be reversed, where the HAL Test Subsystem 96 directly modifies hardware, then the HAL 66 is utilized to verify subsequent HAL requests.

In FIG. 4, the HAL Test Routine 96 is connected via a Serial Port 86 and a communications link 97 to an external HAL Control System 98. This is usually another computer. Note that in this embodiment, the standard device drivers 70, 72, 74, usually need not be loaded into memory.

In FIG. 5, a HAL Test Driver 99 is a User Program 63 residing in User Space 62. It communicates with the HAL Test Subsystem 96 operating in Kernel Space 60. This implementation does not require a separate computer 98 and communications line 97 as shown in FIG. 4, but does require that more of the Kernel 64 and drivers 70, 72, 74 be loaded, since the HAL Test Driver 99 must depend on the normal Operating System (OS) interfaces for operation. For example, the Test Driver 99 will usually be loaded for execution from Secondary Storage 30. This will usually require interfacing with the file subsystem 68, Kernel 64, HAL 66, SCSI Driver 70, Interrupt Controllers 78, etc.

Those skilled in the art will recognize that modifications and variations can be made without departing from the spirit of the invention. Therefore, it is intended that this invention encompass all such variations and modifications as fall within the scope of the appended claims.

We claim:

1. A method for using a hardware application layer of an operating system, the method comprising the steps of:
   A) loading a, a hardware application layer of a test subsystem as a device driver into a kernel memory space of a computer,
   B) issuing at least one hardware application layer command by the hardware application layer test subsystem, and
   C) comparing expected results from the hardware application layer command with actual results.

2. A system for using a hardware application layer of an operating system, the system comprising:
   A) means for loading a, hardware application layer test subsystem as a device driver into a kernel memory space of a computer,
   B) means for issuing at least one hardware application layer command by the hardware application layer test subsystem, and
   C) means for comparing expected results from the hardware application layer command with actual results.

3. A method of testing at least a portion of an operating system, the method comprising the steps of:
   providing a hardware platform to be tested;
   porting a hardware application portion of an operating system to the hardware platform;
   loading an object file including an operating system kernel onto the hardware platform;
   loading a kernel mode test device driver onto the hardware platform; and
   testing the hardware application portion of the operating system using the kernel mode test device driver.

4. The method of claim 3, further comprising the step of dynamically linking the test device driver to the operating system kernel.

5. A method of porting an operating system from a first platform to a second platform, the operating system having a fixed portion and a first platform specific portion supporting the first platform, the method comprising the steps of:
   providing a second platform specific portion of the operating system that supports the second platform;
   modifying the operating system by adding the second platform specific portion to create a ported operating system; and
   testing the second platform specific portion of the ported operating system using a test mode device driver loaded into a kernel space of the ported operating system, the test mode device driver not accessible from a user space of the operating system.

6. The method of claim 5, further comprising the step of communicating test data outside of the kernel space of the ported operating system.

7. The method of claim 5, wherein the test mode device driver comprises software to access and control specific hardware of the second platform.

8. The method of claim 7, wherein the specific hardware is selected from the group consisting of computing elements, registers, peripheral devices, and peripheral buses.

9. A system for testing at least a portion of an operating system, the system comprising:
   a hardware platform to be tested;
   a hardware application portion of an operating system ported to the hardware platform; and
   a kernel mode test device driver loaded onto the hardware platform;
   wherein the hardware application portion of the operating system is testable using the kernel mode test device driver.

10. The system of claim 9, wherein the hardware platform has an object file including an operating system kernel loaded thereon.

11. The system of claim 9, wherein the kernel mode test device driver is dynamically linked to the operating system kernel.

12. The system of claim 9, wherein the test mode device driver comprises software to access and control specific hardware of a hardware platform.

13. The system of claim 12, wherein the specific hardware is selected from the group consisting of computing elements, registers, peripheral devices, and peripheral buses.

* * * * *